United States Patent [19]

Rogers

[11] Patent Number: 4,572,667
[45] Date of Patent: Feb. 25, 1986

[54] FLUORESCENT AIR DATA MEASUREMENT DEVICE

[75] Inventor: Philip L. Rogers, Granada Hills, Calif.

[73] Assignee: Lockheed Corporation, Burbank, Calif.

[21] Appl. No.: 328,476

[22] Filed: Dec. 8, 1981

[51] Int. Cl.[4] ............................................. G01N 21/64
[52] U.S. Cl. ................................ 356/317; 250/461.1; 356/318; 356/417; 378/44
[58] Field of Search ............... 356/317, 318, 301, 417; 250/343, 346, 372, 373, 459.1, 461.1; 378/44–50

[56] References Cited

U.S. PATENT DOCUMENTS

| 2,925,007 | 2/1960 | Silver | 88/14 |
| 3,766,380 | 10/1973 | Menzies | 250/343 |
| 3,850,525 | 11/1974 | Kaye | 356/73 |
| 3,958,108 | 5/1976 | Shimomura | 235/150.25 |
| 4,071,298 | 1/1978 | Falconer | 356/73 |
| 4,099,872 | 7/1978 | White | 356/85 |

OTHER PUBLICATIONS

Measures et al., "Analyzing Fluorescence Decay", Laser Focus, Nov. 1974, pp. 49–52.
Eisenthal, "Laser Induced Luminescence", IBM Technical Disclosure Bulletin, vol. 8, #7, pp. 983, Dec. 1965.
Article Appearing in Optical and Quantum Electronics for 1975, at pp. 147–177, entitled "Review: Remote Air Pollution Measurement" by R. L. Byer.
Article Appearing in Patrol Log for Fall 1981, at p. 9, entitled "A Traveler Returns".

Primary Examiner—F. L. Evans
Attorney, Agent, or Firm—Frederic P. Smith

[57] ABSTRACT

Induced fluorescence of air molecules is used to determine air data parameters such as barometric altitude. The air molecules at a sample location are caused to fluoresce by means of a suitable energy source. A detector having an effective field of view including the sample location measures the fluorescence emitted by the air molecules in the detection sample (the portion of the fluorescing region viewed by the detector). By the use of appropriate filters and/or appropriate selection of the energy source, it is possible to measure fluorescence only from a particular type of air molecule. Since the measured intensity is proportional to the number of excited air molecules, it is possible to compute the density of the air, the static pressure of the air, the partial density and pressure of any individual molecular species, and/or the barometric altitude. Accordingly, many critical air data parameters may be measured by means of equipment contained wholly within the skin of an aircraft, without requiring any pressure ports communicating with the external environment. If the fluorescing energy is switched on and off, an exponential decay of the fluorescence occurs, with mean fluorescence lifetime varying with the density of the fluorescing molecules. It is thus possible to utilize differences in intensity rather than absolute intensity measurements to determine the parameters of interest.

9 Claims, 6 Drawing Figures

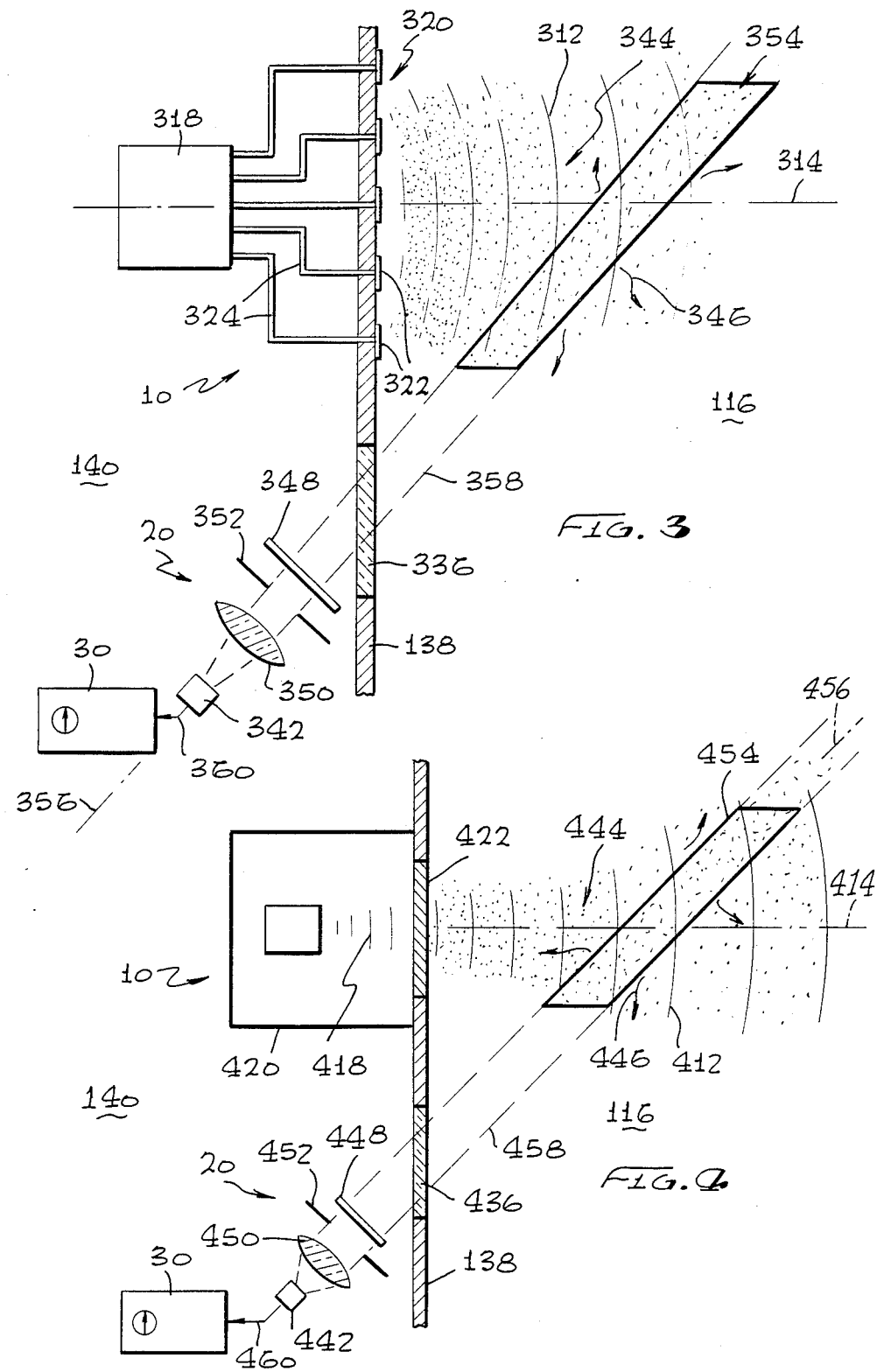

FLUORESCENT AIR DATA MEASUREMENT DEVICE

TECHNICAL FIELD

The invention relates generally to the field of air data measurement systems and more particularly to a measurement device which utilizes induced fluorescence of one or more particular types of air molecules to determine air data parameters such as density, pressure, and/or barometric altitude.

CROSS-REFERENCE TO RELATED APPLICATIONS

Commonly assigned Co-pending U.S. patent application Ser. No. 328,721, filed Dec. 8, 1981 entitled "Compact Radiation Fringe Velocimeter for Measuring in Three Dimensions" discloses an improved technique for measuring other parameters associated with the operation of an aircraft, such as true air speed, side slip angle, and angle of attack. Its teachings may be combined with the teachings of the present application so as to result in an aircraft flight parameter measurement system that advantageously exploits the features and benefits of both inventions.

BACKGROUND ART

It has long been conventional to measure changes in altitude by means of mechanical instruments sensitive to changes in pressure of the earth's atmosphere from one elevation to another. Accordingly, it is conventional to provide an aircraft with one or more static pressure ports so that the external air pressure is exerted upon a pressure measuring diaphragm containing within the aircraft. However, significant inaccuracies may result from disturbances of the airflow in the region of the pressure port caused by icing, by air currents and turbulence, and by air compression effects or from changes in the orientation of the port relative to the airflow caused by changes in the attitude of the aircraft.

Since it is a well known law of nature that the pressure of a gas is linearly related to its density and temperature, it is also possible to compute the pressure of the air at a given elevation from measurements of other physical quantities of the air such as air density and temperature, and then to use the thus computed pressure to determine barometric altitude.

U.S. Pat. No. 2,925,007 in the name of Marvin N. Silver teaches a method and device for measuring the pressure of a gas inside a transparent vessel, such as a vacuum tube in a laboratory. Silver assumes that the amount of light that will be scattered at a given acute angle with respect to the forward direction of the light propagation is proportional to the amount of gas contained within the vessel and accordingly employs a photodetector to measure the amount of light scattered forwards from a beam of light rays projected into the enclosure. However, a simple scattered light type of device would not be suitable for measuring the air pressure external to a flying aircraft, since the light-detector would be exposed not only to the scattered light originating from the projected beam of light rays, but also to unpredictable quantities of scattered and direct background radiation from the sun and other celestial objects. Furthermore, in the laboratory the composition of the gas remains constant while the vessel is being evacuated; accordingly, it is immaterial whether or not the gas contains an exceptionally large proportion of aerosol particles which will cause a significantly greater percentage of the projected light to be scattered in the direction of the photodetector. Obviously, any measurement technique that assumes that the composition of the earth's atmosphere is homogeneous would be subject to significant errors. Finally, if both the light emitter and the light detector are to be contained within a single compact unit, then it becomes impractical to employ any forward scattering technique since the detection volume cannot then be located at a sufficiently remote distance from the aircraft that it is in the free air stream, and not subject to disturbance by the aircraft itself.

U.S. Pat. No. 4,071,298 in the name of David G. Falconer teaches the use of various techniques to detect and measure individual, relatively large aerosol particles, particularly cyclic aromatic hydrocarbons and aldehydic and ketonic derivatives. Among the techniques discussed are the use of a laser to cause the target molecules to fluoresce and the use of a narrow band filter to pass only the frequencies of interest. By such means, Falconer is able to measure light received from a single aerosol particle and thereby to determine the effective cross-sectional area of the scattering particles. Although the aerosol particles being analyzed are contained within a stream of air, it is to be emphasized that Falconer's system is insensitive to any physical parameters such as pressure or density associated with the air stream itself.

U.S. Pat. No. 4,099,872 in the name of John U. White teaches the use of a fluorescent spectrophotometer in which a beam of radiation from a xenon arc ("or other suitable source of visible or invisible light") is directed by means of a suitable optical system onto a sample and causes the sample to emit fluorsecence of a wavelength different from that of the excitation light source. White's system utilizes monochrometers for selecting a highly monochromatic portion of the luminescent emission from the sample and focuses this monochromatic portion on a photo-electric detector which produces an output signal proportional to the intensity of the light. By means of a rotating beam chopper that alternatively interrupts the excitation beam impinging on the sample and a reference beam also originating from the same excitation source, the detector is alternatively illuminated by the fluorescent emission and by the excitation beam, thereby resulting in an output signal level which alternately represents the unknown luminescent intensity from the sample and the intensity of the reference beam whereby a signal may be generated corresponding to the ratio of the net sample signal to the net reference signal.

U.S. Pat. No. 3,850,525 in the name of Wilbur I. Kaye teaches the employment of two different radiant energy detectors in a single system, whereby scattered light from a solid or liquid sample in a laser light scattering photometer may be the subject of simultaneous multiple measurements (e.g., at two different angles or at two different wavelengths). Such a system is sensitive to background radiation and Kaye attempts to minimize any undesired increase in the background level caused by the diffraction from the inner edge of an annulus used to define the solid angle of interest by providing a mirror to transmit the diffracting rays to a light trap rather than to the detector.

U.S. Pat. No. 3,958,108 in the name of Naomobu Shimomura relates generally to barometric altimeters such as those used in aircraft and more specifically to electronic barometric altimeters in which an electric signal from a mechanical pressure transducer is conditioned so as to provide an accurate digital indication of aircraft altitude in accordance with well known air data equations.

It has also been proposed to use a high power pulse laser transmitter and a receiver with range gating circuitry to look at the fluorescence or Raman scattering return signal from a localized region of the atmosphere and thus to determine concentrations of various molecular constituents in such region and, in particular, the concentration of pollutants such as NO, $NO_2$, CO, $SO_2$, and $O_3$ (nitrous oxide, nitric oxide, carbon monoxide, sulphur dioxide, and ozone). For some applications, knowledge of the local concentration of $H_2O$ and/or $CO_2$ (water and/or carbon dioxide) may also be desirable. With regard to the foregoing, an article appearing in Optical and Quantum Electronics for 1975 at pages 147–177 entitled "Review: Remote Air Pollution Measurement" by R. L. Byer and an article entitled "A Traveler Returns" (concerning a specially equipped aircraft in use by the National Oceanic and Atmospheric Administration) appearing at page 9 of Patrol Log for Fall 1981 (published by the assignee of the present invention) are additionally cited as exemplary of various prior art approaches to air data measurements.

However, taken as a whole, the known prior art does not teach or suggest how air data parameters that are critical to the operation of an aircraft (such as density, pressure, and/or barometric altitude) can be simply and reliably measured by means of an accurate and reliable measurement device free of any pressure ports or protrusions into the airstream.

Furthermore, such known prior art does not teach or suggest any reliable method for making air data parameter measurements at a sample location at a sufficient distance from the aircraft or any physical attachments thereto that the measurement will not be subject to systemic errors of a sort that cannot always be fully compensated for such as those caused by air compression effects and airflow disturbances.

Moreover, the known prior art does not teach or show how fluorescent emissions, and, in particular, how the decay characteristics of such fluorescent emissions once the fluorescent energy source has been interrupted, may be utilized to calculate air data parameters such as the relative density of a particular molecular species or, if the fluorescing molecules represent a known percentage of the atmosphere, the density, pressure and barometric altitude of the atmosphere at the elevation at which the measurement is being made.

The teachings and disclosures contained in the above-referenced U.S. patents and the information provided by the other above-referenced publications may contribute to a better understanding of the background of the present invention, as well as of its scope, function and possible manners of implementation and use; accordingly, they are hereby incorporated in their entirety by reference the same as if fully set out herein.

Accordingly, it is one object of the present invention to use fluorescence to sense air data parameters.

It is a related object to provide a system which is capable of examining by optical means contained within an aircraft physical properties of an air sample in a nearby free airstream to determine aircraft altitude, air density, water vapor content, carbon dioxide content, and the like.

Another related objective is to provide a system of the type described that may have its sensor unit mounted inside the unbroken aerodynamic skin of the aircraft so as to result in no drag penalty.

Yet another related objective is to provide an aircraft flight performance measurement system that may be integrated with a radiation velocimeter so as to completely dispense with the need of any conventional pneumatic systems such as Pitot static probes, pneumatic tubing, and pressure transducers.

It is yet another related objective to provide such a system wherein the sensor components could be mounted flush with the skin of the aircraft.

It is a more specific object to provide a fluorescence altitude measuring system for optically measuring the density of an air mass and/or of one or more principal constituents thereof located at some distance from the aircraft where the air mass is relatively undisturbed.

It is yet another more specific object of the invention to provide such an altitude measurement system wherein the physical interface between the sensor unit inside the aircraft and the external air mass whose properties are being measured is through a window mounted flush with the skin of the aircraft.

Another more specific object is to cause intermittent fluorescence of selected air molecules within a sample volume located external to the aircraft, to observe optically the decay constant associated with such fluoresced air molecules, and then to employ those observations by solving basic air data equations to result in calculated aircraft flight parameters such as air density, barometric altitude, and density altitude, as well as the concentration of said selected molecules relative to the balance of the sample.

An overall object of the present invention is to provide a system for measuring barometric altitude or other density-related parameters by utilizing an electro-optical system mounted inside an aircraft to determine the physical properties of an external air mass located at a distance from the aircraft.

DISCLOSURE OF INVENTION

Induced fluorescence of air molecules in the external airstream is used to determine air data parameters such as altitude for an aircraft. The air molecules in a sample location are caused to fluoresce by means of, for example, a beam of energy from a laser. A photodetector having an effective field of view including the sample location measures the fluorescence emitted by the air molecules in the detection sample (the portion of the fluorescing energy beam viewed by the detector). By the use of appropriate filters and/or appropriate selection of the energy source, it is possible to measure fluorescence from only a particular type of air molecule, such as nitrogen ($N_2$), which constitutes a relatively constant and predictable proportion of the earth's atmosphere, or such as water ($H_2O$), which (depending on meterological conditions) can vary greatly in proportion to the other components of the atmosphere.

Since the measured fluorescence intensity is proportional to the number of excited molecules fluorescing with the spectral range of the photodetector and any associated filters, it is possible to compute the density of the air, the static pressure of the air, the partial density and pressure of any individual molecular components of the air, and/or the barometric altitude. Accordingly, it is possible to measure many critical air data parameters optically by means of equipment contained wholly within the interior of an aircraft or other enclosed space and without requiring any pressure ports communicating with the external environment.

If the fluorescing energy is switched on and off, an exponential decay of the fluorescence results and it is possible to utilize differences in intensity rather than absolute intensity measurements. The system can thus be made insensitive to background radiation and essentially independent of calibration errors caused by degraded component performance and variations in alignment geometries.

BRIEF DESCRIPTION OF DRAWINGS

FIG. 3 shows a third embodiment in which an array of antenna elements connected to a suitable ratio frequency source causes a region of air to fluoresce;

FIG. 4 shows a fourth embodiment in which a field of "soft" X-rays is utilized to induce fluorescence in many different molecular species;

BEST MODES FOR CARRYING OUT THE INVENTION

Figure 1:
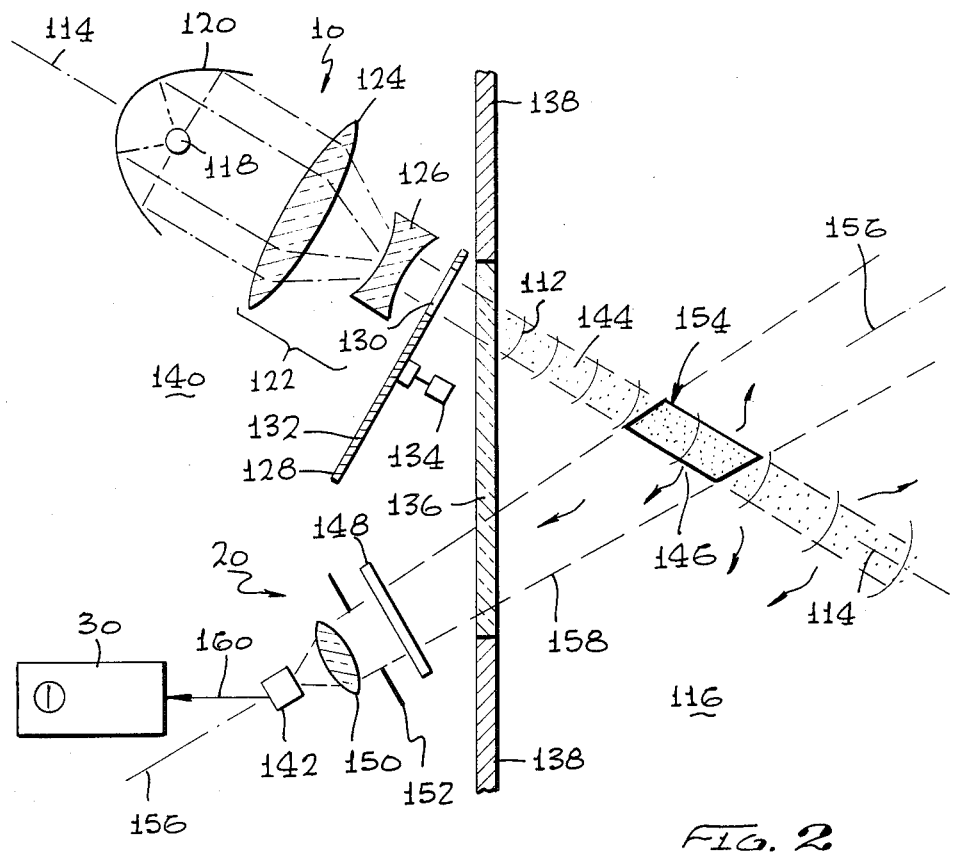
FIG. 1 is a schematic diagram showing the major components of a first embodiment of an air data measurement device constructed in accordance with the present invention and their functional and spatial relationships with respect to the location of the air sample for which the measurements are being made.

Referring now to FIG. 1, it may be seen that a first embodiment of the invention comprises three main components: a source of radiant energy (10), a detector subsystem (20) for the emitted energy, and an instrumentation subsystem (30). Energy source (10) generates a beam (112) of radiant energy which as shown assumes a generally cylindrical shape oriented along a first axis (114). However, it should be understood that the shape of the beam associated with energy source (10) need not be cylindrical or tubular, but may also be in the form of other geometrical shapes including such converging and diverging shapes as cones or pyramids. Furthermore, it should be understood that the level of radiant energy within this beam need not necessarily be absolutely uniform, and accordingly, there may not necessarily be a clear-cut boundary layer separating the interior region of said beam from the exterior thereof. It should also be understood that the present invention may also find utility with energy sources that have no one single axis associated therewith, but rather emit radiation along a plurality of axes. In that case, as used herein, the phrase "radiant energy axis" will normally be intended to include any axis along which there is a propagation of radiant energy in the external atmosphere (116), and the term "energy beam" is intended to include any region through which there is propagated radiant energy of an intensity sufficient to induce some degree of fluorescence in any molecules of interest located in the vicinity of such a beam.

As depicted diagrammatically in FIG. 1, the energy source (10) is a mercury vapor light bulb (118) located in front of a parabolic reflector (120). (In the interest of clarity, power supply to the light bulb is not shown nor is the supporting structure for the bulb and other major components of the energy source (10). Light from the bulb (118) is directed towards condensing optics (122) (shown diagrammatically as comprising a convex lens (124) and a concave lens (126)). Accordingly, in accordance with well-known optical principles, the ultra-violet (U-V) and/or visible light emitted by the bulb (118) is collimated and condensed into the aforementioned beam (112) of radiant energy oriented along a first axis (114). It will be noted that a mechanical chopping disk (128) having a transparent portion (130) and an opaque portion (132) and rotated by an electric motor (134) is also provided. Such a chopping arrangement periodically interrupts the propagation of energy along the beam axis (114) for purposes that will become more clear hereinafter.

It will be noted that the radiant energy source (10) is separated from the external atmosphere (116) by a transparent window (136) provided as part of the external skin (138) of an aircraft or other enclosed space, the interior of which is indicated in the Drawings by the reference numeral (140).

Also contained within the interior space (140) is the aforementioned detector subsystem (20) which comprises a detector (142) which may utilize a light sensitive diode or other appropriate device sensitive to at least one of the wavelengths of fluorescent emissions that may be emitted by the molecules of interest in the atmosphere (116). In that regard, it will be seen that the portion of the beam (112) passing through the atmosphere (116) is shown somewhat shaded to indicate fluorescence (144). More precisely, the various molecules in the air of the atmosphere (116) are absorbing individual photons of energy radiated by energy source (10) as they travel along beam (112) and are then re-emitting this energy distributed across a particular fluorescent spectrum unique to the particular type of molecule. In the Drawings, the re-emitted fluorescent radiation is indicated by a wavy arrow (146), and is uniformly distributed in all directions, including towards the detector subsystem (20).

By providing an appropriate filter (148) between the fluorescing molecules and the detector (142), it is thus possible to correlate the output of photodetector (142) with the fluorescent intensity of a particular type of molecule or molecular species. Detector subsystem (20) is also provided with a focusing lens (150) for focusing the fluorescent re-emissions onto the active area of the photodetector (142) and with an aperture diaphragm (152) which effectively limits the field of view of the detector subsystem to a sample volume region (154) spaced preferably some distance from the aircraft itself. In this way, the system of FIG. 1 will not be measuring physical properties of an air sample that has been severely disturbed by compression and other aerodynamic effects that are especially severe adjacent to the external surfaces of the aircraft as it flies through the air.

For convenience, the geometrical configuration of FIG. 1 will hereinafter be referred to a "cross-axis" system with its second axis (156) being defined by the active area of the photodetector (142), the central area of the aperture diaphragm (152) and the lens (150). In such an arrangement, preferably first axis (114) and second axis (156) should actually intersect at a point in the external atmosphere (116) some distance from the skin of the aircraft (138) and its associated window (136). However, it should be understood that the system will still be operative despite some slight misalignment between the two axes, provided that the effective field of view (indicated symbolically by reference numeral (158)) associated with detector subsystem (20) sufficiently overlaps the radiant energy beam (112) associated with the energy source (10) so as to define a sufficiently large sample volume (154) that the fluorescent emissions from that sample volume will be sufficient to cause a meaningful output signal (160) generated by the photodetector (142) to be supplied to instrumentation subsystem (30).

Instrumentation system (30) then processes the output signal (160) in accordance with the known mathematical relationship (discussed in detail hereinafter) between differences in the intensity of the fluorescence observed by the photodetector (142) and the parameter of interest.

Figure 2:
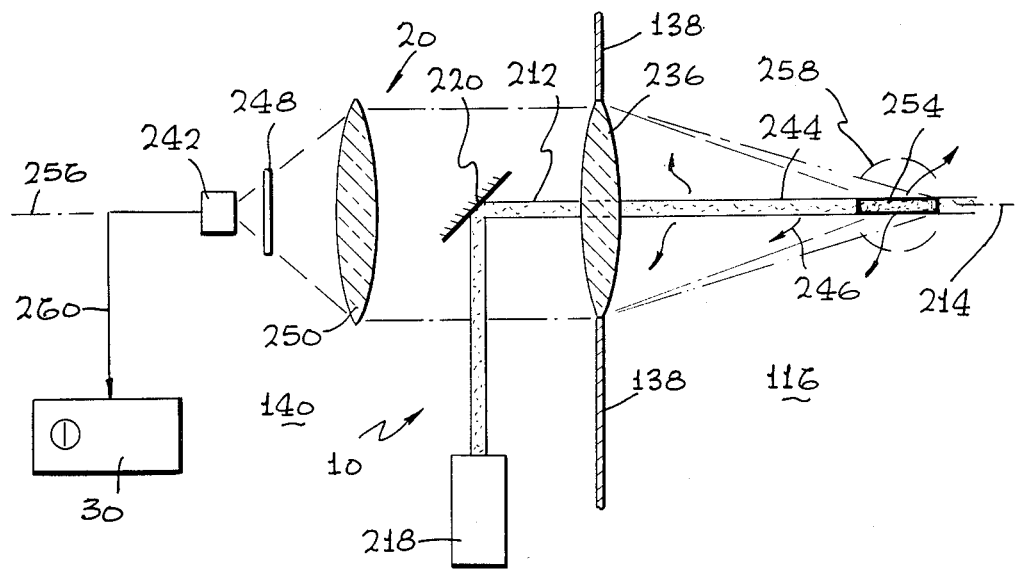
FIG. 2 shows a second embodiment of such a device wherein the location of the air sample is determined by the focal distance of a lens element.

Referring now to FIG. 2, it will be seen that this Figure illustrates diagrammatically a second embodiment of the present invention of a type that will hereafter be referred to as a "co-axial arrangement", since the axis (214) of the radiant energy beam (212) passing through the external atmosphere (116) is co-axial with the optical axis (256) of the detector subsystem (20). In such a co-axial arrangement, the sample region (254) is defined not by the intersection of the field of view of the detector subsystem with the region of fluorescence, but rather by the region in space at which the field of view (258) of the detector (242) is focused to converge upon a concentrated radiant energy beam (212).

In the embodiment of FIG. 2, the radiant energy source (10) is a laser (218) which generates a highly collimated monochromatic coherent beam of laser light (212) which is deflected by means of a mirror (220) so as to travel towards the sample region (254) co-axially with respect to the optical axis (256) of the detector subsystem (20). It will be noted that, in contrast to the arrangement shown in FIG. 1, the optically neutral transparent window has been replaced by a second lens (236) mounted flush with the skin (138) of the aircraft. The focal length of such a lens effectively determines the spacing between the sample region (254) and the aircraft's outer surface (138); its diameter determines the effective aperture and depth of field of view (258) of the detector subsystem (20), thereby obviating any requirement for a separate aperture diaphragm analogous to the aperture diaphragm (152) of the embodiment of FIG. 1.

Accordingly, fluorescent re-emissions (246) radiating from the sample region (254) towards the window lens (236) are collimated in the direction of a second lens (250), which then focuses such emissions onto the active area of the detector (242), the output (260) of which is connected to the instrumentation system (30).

By appropriate choice of the frequency of the light emitted by the laser (218), it is possible to cause only one particular molecular species within the atmosphere (116) to fluoresce with sufficient intensity for such fluorescence to affect the output (260) of the detector (242). For example, if the only molecular species of interest is Nitrogen ($N_2$) (and in that regard, it should be remarked that the proportion of $N_2$ within the atmosphere is relatively constant, at least at the elevations at which aircraft are normally operated, and therefore the density of $N_2$ within a given sample of atmospheric air will be a reliable indication of the air pressure and barometric altitude in the vicinity of the sample), then the $N_2$ molecules in the sample region, rather than other species not of interest, may be caused to fluoresce by means of an $N_2$ laser.

Furthermore, the embodiment of FIG. 2 has not been shown as having any mechanical chopper for periodically interrupting the output of the laser (218), even though (for reasons which will become more clear hereinafter), it is preferable that the output signal (260) from the photodetector (242) be indicative not of overall fluorescent intensity but rather of the decay characteristics of the fluorescence following the interruption of the radiant energy which causes the fluorescence. However, many types of lasers are normally operated in a pulse mode, with the blank intervals between successive pulses sufficiently long (compared to the mean fluorescence lifetime of the molecules of interest) to permit the decay characteristics of the fluorescence to be accurately measured.

Finally, it should be understood that, although a laser has many properties which make it particularly suitable as a radiation source in an embodiment of the present invention such as is illustrated in FIG. 2, neither the invention generally nor the FIG. 2 embodiment specifically requires a coherent beam of light. Additionally, since the output of the laser (218) is already highly collimated, it would be possible to replace the window lens (236) with an optically neutral window (such as the flat window (136) of the FIG. 1 embodiment) (in which case the focusing lens (250) should be moved further from the photodetector (242)), or alternatively, to employ a single window lens of higher power such that the fluorescent radiation emitted from the sample region (242) is focused directly onto the detector area of the photo detector (242).

Referring now to FIG. 3, it will be seen that this Figure represents yet a third possible embodiment of the present invention in which the energy source (10) is a radio frequency transmitter (318) connected to a phased array antenna (320) comprising a plurality of individual radiating elements (322) which radiate a beam of radio frequency electromagnetic radiation (312) directed away from the aircraft's skin (138) to create a fluorescent cloud (344) along a first axis (314).

Oriented along a second axis (356) is the field of view (358) of the detector subsystem (20), said second axis (356) intercepting said first axis (314) (in a manner similar to that of the crossed axis arrangement of FIG. 1) to establish the location in space of the air sample volume region (354). The detector subsystem (20) comprises a filter (348), a focusing lens (350), and an aperture diaphragm (352) in addition to the photodetector (342). All of the aforementioned detector subsystem elements are located at the interior (140) side of the window (336) and may be the same as already described above with reference to the embodiment of FIG. 1 and/or FIG. 2. Since the antenna array radiating elements (322) are shown mounted on the outside surface of skin (138), shielded leads (324) are provided for the transmission of radio frequency energy from radio frequency transmitter (318) to said radiating elements (322).

Still a fourth embodiment is shown in FIG. 4. In this embodiment, the radiant energy source (10) is contained within a shielded enclosure (420) and comprises a source (418) for generating short wave length ("hard")

X-rays directed onto a beryllium window (422). The beryllium absorbs the hard X-rays and re-emits "soft" X-rays of a longer wave length as a beam (412) directed away from the surface (138) of the aircraft into the external atmosphere (116). Because the beryllium window will re-emit X-rays of many different wavelengths, and because even soft X-rays have a wavelength that is relatively short compared to the effective absorption cross-sectional area of the various molecules that comprise the atmosphere, it may be expected that every significant molecular component of the atmosphere will be caused to fluoresce and, accordingly, photodetector (442) will respond to whatever radiation is passed by filter (448). However, as mentioned previously, it is a simple and conventional matter to utilize a filter having a relatively narrow band pass centered about a fluorescent spectral line frequency associated only with the molecular species of interest and not with the radiation emitted when other molecular species likely to be present in quantity in the atmosphere are fluorescing, and thus to ensure that the detector subsystem (20) will respond only to the fluorescence of molecules of interest.

Preferably, the radiant energy beam (412) is cylindrical with the attendant advantage that the radiant energy is highly collimated and does not fall off in intensity as rapidly as would uncollimated energy emisions from a point source.

The detector subsystem (20) has associated therewith a field of view indicated diagrammatically by the reference numeral (458) and the depicted image of an imaginary cylinder in dashed outlined centered about a second axis (456) that preferably intersects, and in any event approaches the vicinity of, the first axis (414) so as to result in a sample volume (454) being defined by the intersection in three dimensional space of the detector's effective field of view (458) with the radiation beam (412).

Figure 5:
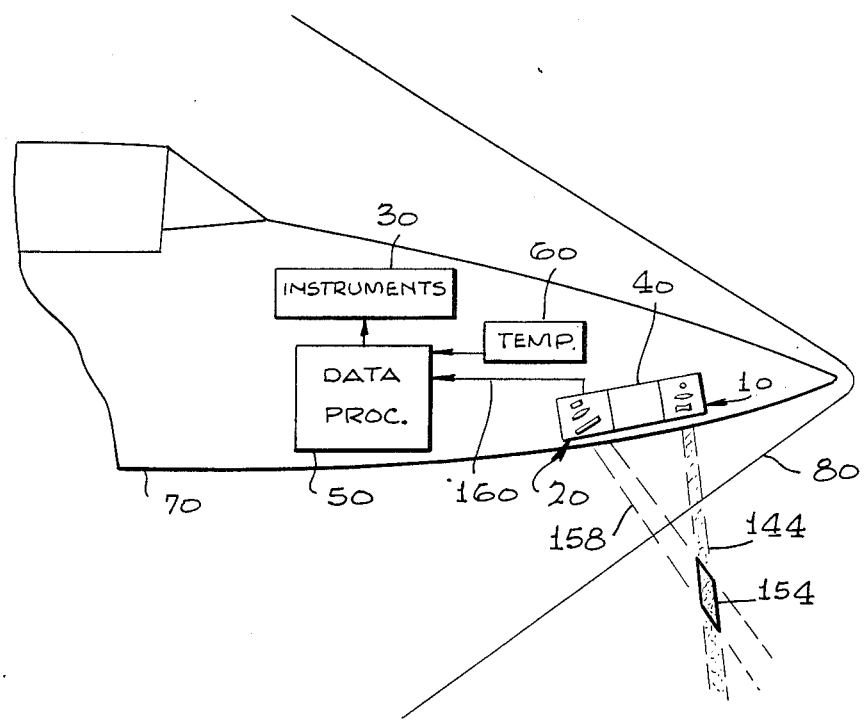
FIG. 5 shows a representative device constructed in accordance with the present invention conformally mounted inside a supersonic aircraft, and also shows the relationship of the air sample being measured to the supersonic shock wave and skin compression effects in the vicinity of the device.

Referring now to FIG. 5, it will be seen that this Figure reflects an exemplary embodiment of the present invention installed aboard a supersonic aircraft (70). In the Figure, the fluorescent air data measurement device is shown as being of the above-described crossed axis configuration, but it should be understood that a coaxial configuration is equally suitable for aircraft use. Referring specifically to the crossed axis embodiment shown, it will be seen that the sample volume (154) defined by the intersection of the fluorescent region (144) with the field of view (158) of the detector system (20) is located at some distance removed from the nearest surface of the aircraft such that the sample volume (154) is in fact located in a portion of the airstream undisturbed by the supersonic shock wave (80).

In FIG. 5, it will also be seen that output (160) of the detector subsystem (20) is preferably conditioned by a data processor (50) prior to display by the instrumentation system (30). The data processor (50) also has, as another input, a temperature signal (60) provided by a conventional temperature sensing subsystem (a value for temperature is required to derive the pressure of a gas from its density).

The systems such as have been described above with particular reference to FIGS. 1 through 5 (or other alternative embodiments of the present invention not described in detail herein) in effect use optics to measure density of the air mass. Air density (D) combined with static temperature ($T_s$) can be used to determine pressure altitude ($P_s$):

$$P_s = DRT_s$$

where R is the ideal gas constant.

Static temperature ($T_s$) can be determined from total temperature ($T_t$) and Mach number (M):

$$T_s = T_t(1 + 0.2M^2)^{-1}$$

The latter two quantities may be measured independently by conventional means.

Figure 6:
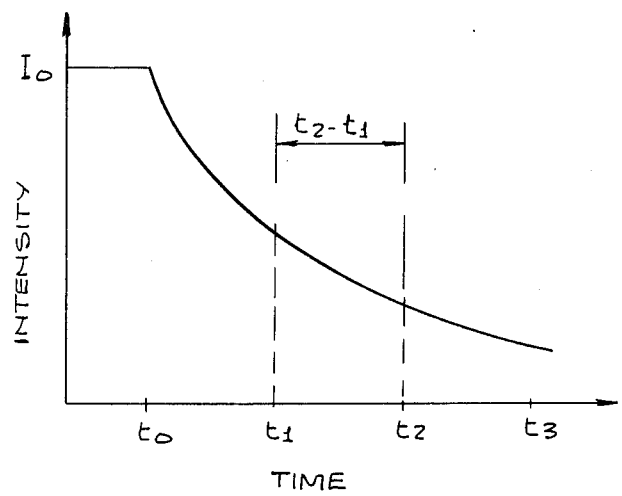
FIG. 6 is a graph showing the decay of the intensity of fluorescence as a function of time following the interruption of the source of the fluorescing energy.

For a pulsed energy source (which is normally preferred), the fluorescent light intensity decays exponentially, and if the intensity is measured at two different times, $t_1$ and $t_2$, the decay is expressed by:

$$I_2/I_1 = e^{-(t_2 - t_1)/L}$$

where L is the mean fluorescence lifetime, and is related to the mean molecular collision time and hence to the density of the gas. FIG. 6 illustrates graphically such an exponential relationship between Intensity (I) and Time (t) in which it can be seen that at equally spaced intervals of time (e.g., "$(t_1 - t_2)$") following the interruption of the energy source at time $t_0$, the intensity is successively reduced by factors of approximately two.

This can be seen by considering a fluorescence quenching mechanism; e.g., the Stern-Volmer mechanism. Consider a case in which a molecule M is excited, by a radiation source, to a state M*. Assume that fluorescence, collisional deactivation by a like molecule M or some other molecule A, and photodecomposition are the only processes by which M* can relax. These processes can be expressed by:

$$M^* \xrightarrow{(k_1)} h\nu + M$$

$$M^* + M \text{ (or A)} \xrightarrow{(k_2)} M + M' \text{ (or A')}$$

$$M^* \xrightarrow{(k_3)} B + C$$

where $k_1$, $k_2$ and $k_3$ are reaction rate constants for the indicated processes; the lifetime L is related to these rate constants.

In the atmospheric measurement case, the third process, photodecomposition, is probably not important.

The collision rate constant is merely the mean collision rate between the excited molecule and all other molecules present. Computing the collision cross section for a molecule M colliding with another molecule (either M or A), it can be shown that the collision type is given by:

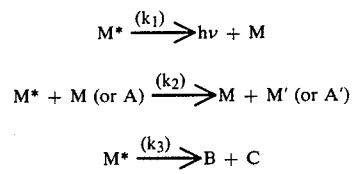

where $n_M$, $n_A$ are the number densities of species M and A respectively, $d_{MA}$ is the average diameter of molecules M and A, k is the Boltzmann constant, T the absolute temperature, $m^*_{MA}$ is the reduced mass of molecules M and A, and Y is a symmetry factor that is 1 for $M \neq A$ and 2 for $M = A$. By multiplying and dividing by the masses of M and A, the number densities can be converted into mass densities, the quantities of interest.

Hence, by measuring the intensity of the emitted light at two different times, the mean fluorescence lifetime L can be determined and the density can then be computed from the relation between mean lifetime L and the collision $Z_{MA}$ rate calculated above.

The above-described technique has several advantages, including sensitivity to even short-lived fluorescence at low altitudes (high density, pressure), and freedom from calibration of the photodetector for absolute intensity measurement, since only relative intensity is used.

The concentration of water vapor, specifically, may be measured by the same technique described above through the use of optical filters selected for the fluorescence spectrum of water. This combined with a knowledge of air density and temperature enables the conditions for ice and contrail formation to be determined more accurately.

While the invention has been described in detail with respect to certain specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

INDUSTRIAL APPLICABILITY

Accordingly, it may be seen that the present invention may be embodied in various new and useful devices which find particular applicability in the field of avionics, both as a substitute for conventional barometric altimeters, and to supplement existing instrumentation.

I claim:

1. A fluorescent air data measurement device for measuring air data parameters, such as density, pressure, and/or barometric altitude, comprising:
   first means for causing gaseous molecules to emit fluorescence, the region of said fluorescence being generally oriented as a beam centered about a first axis passing through a detection volume;
   second means having a field of view oriented about a second axis also passing through said detection volume for generating a first output signal representative of the intensity of said fluorescence of said gaseous molecules within said detection volume, said detection volume being defined by the intersection of said fluorescence beam with said field of view and being situated in a free airstream; and
   third means responsive to said first output signal and to a second output signal representative of temperature for generating a third output signal representative of an air data parameter.

2. The fluorescent measurement device of claim 1, further comprising fourth means for causing said first means to be alternatively activated and deactivated, whereby said intensity of said fluorescence within said detection volume will from time to time decay in a generally exponential fashion, and wherein said third means is further responsive to elapsed time whereby said third output signal may be derived from the ratio of intensity measurements at two given points in time while said fluorescence is decaying in said generally exponential fashion, thereby obviating any necessity for an absolute calibration of said first output signal generated by said second means.

3. The fluorescent measurement device of claim 1 or 2 wherein said fluorescence is induced by any convenient radiant energy source located aboard an aircraft, and said detection volume is in a portion of the airstream external to said aircraft and remote from any airfoil attached thereto.

4. The fluorescent measurement device of claim 3 wherein said radiant energy is selected from the group consisting of light, X-ray beams, and radio frequency electromagnetic waves.

5. The fluorescent measurement device of claim 3 wherein said second and third means are all wholly contained within said aircraft, said aircraft having a body skin provided with a first window portion transparent to the energy from said energy source and a second window portion transparent to said fluorescence, whereby said first, second and third means may function free of any adverse environmental effects associated with said airstream and without exerting any adverse effects on the said flight characteristics of said aircraft.

6. The fluorescent measurement device of claim 5 wherein said first window portion and said second window portion physically overlap each other.

7. The fluorescent measurement device of claim 5 wherein said first window portion and said second window portion are separate and disjoint from each other.

8. The fluorescent measurement device of claim 1 wherein said field of view associated with said second means is a relatively narrow field of view intercepting only a minor portion of said fluorescence beam.

9. The fluorescent measurement device of claim 1 wherein said field of view is a relatively wide field of view encompassing essentially all of said fluorescence beam.

* * * * *